Patented May 6, 1952

2,595,819

UNITED STATES PATENT OFFICE 2,595,819

LUBRICATING OIL ADDITIVES

William H. Smyers, Westfield, and David W. Young, Roselle, N. J., assignors to Standard Oil Development Company, a corporation of Delaware No Drawing. Application January 14, 1950, Serial No. 138,700

3 Claims. (Cl. 252—46.6)

This invention relates to lubricating oil additives and to methods of preparing and using same, and more particularly to hydrocarbon copolymers, of which a styrene-isobutylene copolymer is one example, treated with a phosphorizing agent alone or in conjunction with a sulfurizing treatment in the presence of fatty materials, especially fatty oils. The invention may be illustrated by the $P_2S_5$-treatment of a styrene-isobutylene copolymer in the presence of a fatty oil or ester, such as sperm oil and the like. It relates to the use of the resultant product as an additive in lubricating oils.

Copolymers of styrene and isobutylene, and more generally copolymers of aliphatic olefins with polymerizable cyclic compounds, are disclosed in U. S. Patent 2,274,749. The general method of preparing such copolymers is also disclosed therein and consists essentially in carrying out the copolymerization of the mixed reactants at a temperature below 0° C. such as —10° C., —50° C., —80° C., —100° C., or lower, in the presence of an active polymerization catalyst, and preferably in the presence of an inert, volatile organic liquid serving as solvent and refrigerant.

As one constituent of the copolymer, a cyclic material may be used such as styrene, alphamethyl styrene, p-methyl styrene, alphamethyl p-methyl styrene, namely p-methoxy styrene, p-ethoxy styrene, dihydronaphthalene, 1-vinyl 4-methoxy naphthalene, indene, terpene, coumarone etc., as well as copolymers of indene and coumarone, as well as other compounds such as anethole (1-isopropenyl 4-methoxy benzene), safrole (1-isopropenyl 3,4-methylene dioxybenzene).

The other constituent of the copolymer may be isobutylene or other isolefins such as isoamylene, particularly methyl-2 butene-2, iso-octylene etc., as well as other aliphatic olefins such as propylene, normal butylene, etc.

The proportions in which the styrene or other polymerizable cyclic material and the isobutylene or other aliphatic olefin material may be copolymerized may vary over a wide range from 1% to 99% of the polymerizable cyclic constituent, but a range of about 10 to 60% is preferred. A smaller amount of such cyclic material such as even 1% or less may be used in some cases, it being sufficient for some purposes to have merely 1 or 2 molecules of the styrene or other polymerizable cyclic material combined into a relatively long chain of isobutylene or other aliphatic olefin, the aromatic nucleus of the styrene serving as a chemical means by which the high molecular weight resultant copolymer may be subjected to the subsequent chemical reaction according to the present invention.

For convenience and brevity, the above described copolymer of a cyclic polymerizable material and an olefin will be referred to as a cycalkene copolymer. The specific type of copolymer made from styrene and isobutylene will similarly be referred to for brevity as stybutene. The invention will be illustrated as applied particularly to derivatives of stybutene, although it is not to be limited thereto.

The copolymer to be used may also be a tripolymer of a polymerizable cyclic compound, an olefinic compound and a small amount, between 0.1% to 30% or so, preferably 0.5% to 10% of a diolefin or triolefin, e. g., isoprene, butadiene, etc. One example of such a tripolymer is one comprising about 50% of isobutylene, 47% of styrene and 3% of isoprene, in the combined state.

Still further copolymers may be used such as those made by copolymerizing a diolefin such as butadiene, isoprene, etc. or other polyolefins, with a polymerizable cyclic compound which after copolymerization, will still contain a reactive cyclic nucleus such as the benzene ring in a styrene group, as for instance, copolymers of styrene with butadiene or styrene and isoprene.

In the present invention the products derived from cycalkene polymers are to be used as lubricating oil additives. It is preferred to use as starting material a copolymer containing less than about 40% by weight of polymerizable cyclic compound, especially where V. I. (viscosity index)-improving properties are desired. The preferred copolymers have an intrinsic viscosity greater than 0.3. However, in the case of copolymers having higher combined cyclic content, and having little or no solubility in paraffinic or other lubricating oils, they may be first solubilized by suitable chemical treatment such as by alkylation, e. g., by Friedel-Crafts reaction with an alkyl halide such as amyl chloride or with an olefin such as isobutylene or amylene, or acylation with a mono or dibasic acylating agent, e. g., stearyl chloride, sebacyl chloride, etc., or by condensation with a polyhalohydrocarbon such as dichlor hydrocarbon e. g., ethylene dichloride or a chlorinated paraffin wax containing 10 to 15% or so of chlorine. Both this latter type of condensation and the acylation mentioned previously appear to be useful for imparting pour depressing properties to the copolymer being treated.

It is also preferred, particularly when the resultant products are to be used as lubricating oil additives, to use copolymers of relatively low unsaturation, e. g., having an iodine number of less than 50, and preferably less than 20. For instance, the tripolymer example mentioned hereinabove, made with 50% of isobutylene, 47% of styrene, and 3% of isoprene has an iodine number of about 8, and is satisfactory for the purposes of this invention. Also, a styrene-isoprene copolymer resin having a high content of styrene, should contain less than about 30% of isoprene in order to have an iodine number of less than 80, if preferred, in order to avoid difficulties arising from polymerization while being used as a lubricating oil additive. It is understood, of course, that this last mentioned type of resin, although fairly soluble in fatty oils, has relatively low solubility in mineral lubricating oils, and should preferably be solubilized by one of the methods mentioned hereinbefore.

Now, according to the primary feature of this invention, any one of the above described copolymers, or mixtures thereof, are subjected to chemical treatment in the presence of fatty oil, e. g. sperm oil. This chemical treatment may be carried out in a number of different ways. For instance, for phosphorizing alone, the treating agent may comprise either elemental phosphorus or a phosphorizing compound such as a phosphorus oxyhalide, e. g., POCl₃, POBr₃, etc., phosphorus pentoxide P₂O₅, etc., or mixtures thereof. A preferred class of treating agents is one comprising phosphorus and also an element of the sulfur family which includes sulfur, sellinium and tellurium. Such an agent, which may be considered as of the $R_mY_n$ type where Y is a member of the sulfur family, and $m$ and $n$ are small integers, may consist of a simple mixture of for instance, phosphorus or sulfur, or a compound of these two elements, e. g., P₂S₅, P₄S₃, P₂S₃, P₄S₇, P₂Se₅, etc., or mixtures of such compounds with either or both of the individual elements.

Another preferred class of treating agents may be considered of the P. Y. X. type, where Y is the same as above, and X represents halogen. Examples of such agents include: PSCl₃, PSBr₃, PSFBr₂, PSF₂Br and P₂S₃Br₄. Such agents may readily be made by reacting the appropriate phosphorus halide with hydrogen sulfide; for instance, PSBr₃ is made from PBr₅ and H₂S. A still further type of treating agent is one of the P. O. Y. type, where Y has the same meaning as above, as in the compound P₄O₆S₄. Mixtures of any of the above types of treating agents may be used.

Another modification of the invention comprises first sulfurizing the copolymer, in or out of the presence of fatty oil and then phosphorizing it in the presence of the fatty material. In such a case, the sulfurizing may be effected by heating the copolymer alone or together with a suitable solvent, e. g., carbon disulfide, with elemental sulfur, or by reacting with a sulfurizing compound of the Y. X. type, where Y and X have the same meanings as above, as in the case of sulfur monochloride S₂Cl₂, sulfur dichloride SCl₂, sulfur monobromide S₂Br₂, etc. The subsequent phosphorizing treatment may then be carried out as described above.

In carrying out the above described chemical treatment, the amount of treating (phosphorizing) agent will vary, depending upon the types of copolymer and treating agent used and the extent of chemical modification desired, but normally will range from about 0.1 to 50% by weight of treating agent based on the weight of copolymer treated. The temperature of reaction will of course also vary inversely with the strength and amount of treating agent, and extent of modification desired, but normally will range from about room temperature to about 250° C. or so, generally about 100 to 200° C.

The reaction is also preferably carried out in the presence of an inert liquid serving as solvent and/or a diluent such as paraffinic hydrocarbons e. g., petroleum ether or refined higher boiling fractions such as naphtha, kerosene, gas oil, or lubricating oil.

After the treatment with a phosphorus sulfide, or other treating agent described above, the reaction mixture should be filtered and distilled or otherwise treated to remove any volatile solvent. If desired, the product may then be neutralized or partially neutralized with a basic metal neutralizing agent such as one of the following metals in finely-divided form: Calcium, barium, magnesium, aluminum, tin, nickel, cobalt, sodium, potassium, etc., or the oxides, hydroxides, carbonates, or other suitable compounds of such metals. After such neutralization, the final product should be filtered to remove unreacted neutralizing agent.

As suggested above, an aspect of the invention is carrying out the above described chemical treatment of the copolymer in the presence of a fatty oil such as one or more of the various vegetable oils e. g., soybean oil, linseed oil, cottonseed oil, or animal oils e. g., lard oil etc., or fish oils, e. g., whale oil, sperm oil, etc. When thus phosphorizing the copolymer in the presence of a fatty oil such as those described above, it appears that not only are the copolymer and fatty oil each separately phosphorized, but that there is some co-reaction between these materials so that perhaps a condensation or linking of the fatty oil with the copolymer takes place through the medium of the phosphorizing treatment. In any event, the resultant product is considered to be more stable and more effective as a lubricating oil additive than if the materials were separately treated and then mixed together alone or added to a lubricating oil.

One advantage of the present invention is the presence of aromatic or other cyclic nuclei chemically combined in a hydrocarbon copolymer having a molecular weight ranging from the dimer or trimer stage, but preferably from about 500 to 10,000. The molecular weight may be as much as 100,000 or more in some cases. The type of reaction and the nature of the finished products may be varied and controlled at will to some extent by varying the proportion of aromatic and aliphatic constituents used in making the copolymers, and by controlled variation of the conditions of the copolymerization. For instance, for a product having relatively high viscosity index-improving properties and relatively low cyclic content in the copolymer, one may use for instance from 1% to 30% or so of styrene with 90 to 70% respectively, of isobutylene, and the copolymerization should be preferably carried out at a temperature at least as low as −70° C. On the other hand, for products of lower molecular weight, higher cyclic content and lower viscosity index-improving characteristics, one may use larger amounts of cyclic constituent such as styrene, e. g., from 30 to 50% or more. The copolymerization may be carried out either at the low temperature described or at higher temperatures ranging up to −20° C. or in some cases, up to about 0°C.

Thus, the preferred products of this invention are essentially the reaction products of cyclic-aliphatic copolymers and fatty oils with phosphorus or phosphorus sulfides. They are quite different from those obtained by similar chemical treatment of purely aliphatic polymers, because the aromatic or other cyclic groups present in the copolymers used in this invention, as well as the fatty constituents are readily susceptible to the particular chemical treatments involved. The resultant products appear to differ in chemical characteristics from prior art material by reason of having phosphorus alone or with sulfur attached to the cyclic nuclei, and perhaps to fatty acid radicals, in addition to some which are also attached to the aliphatic portions of the copolymer molecules. The treated products appear to be particularly advantageous as lubricating oil additives because they are polyfunctional in nature and possess some anti-oxidant properties, good extreme-pressure lubricating properties, unusual viscosity index-improving properties, and in some instances, also pour depressing properties.

The advantages and details of the invention will be better understood from a consideration of the following experimental data. The first two examples show the phosphorus treated polymers without fatty oils for comparative purposes.

Example I

A mixture of styrene and isobutylene containing about 15% of styrene was copolymerized at about −30° C., using 15 parts by weight of $AlCl_3$-methyl chloride solution as catalyst and using 3 volumes of methylchloride diluent per volume of mixed reactants. The resultant copolymer, after washing with water and heating to about 180° F. to remove solvent and water, was found to have a molecular weight of about 12,000. A chemical analysis showed 86.64% carbon and 13.36% hydrogen, indicating that the copolymer contained about 14.2% of combined styrene. This copolymer had an intrinsic viscosity of about 0.4.

The above described copolymer was then dissolved as a 10% concentrate by weight in a paraffinic mineral lubricating oil having a viscosity of about 52 sec. Say. Univ., at 210° F. and a viscosity index of about 100. 5% by weight of $P_2S_5$ was then added to the resulting solution, and the mixture was heated at about 150 to 180° C. for 30 minutes. The solution was cooled to room temperature and filtered through a layer of "Hyflo" filter aid (diatomaceous earth) on paper. The clear solution was analyzed and found to contain 2.11% sulfur and 0.74% phosphorus by weight. Viscosity tests indicated that the clear blend containing about 10% of $P_2S_5$-treated styrene-isobutylene copolymer, had a viscosity of 79 sec. Say. Univ. at 210° F., and a viscosity index of 132. Extreme pressure lubricating tests on the Standard Almen machine indicated that the blend was able to carry the full load (15 weight) with gradual loading.

Example 2

30 g. of a stybutene similar to that used in Example 1, but containing about 39% styrene, and which had been sulfated in carbon tetrachloride solution with fuming sulfuric acid, was dissolved in 200 ml. of toluene. 10 g. of $P_2S_5$ was added, and the mixture was heated at the boiling point of the toluene for one hour. After this, the mixture was cooled to room temperature, filtered, and the solvent removed by heating. The $P_2S_5$-treated sulfonated styrene-isobutylene copolymer was found to be soluble in the same paraffinic mineral oil used in Example 1 and chemical analysis of this product showed 3.26% S. and 0.91% P. Tests indicated that the $P_2S_5$-treated sulfonated copolymer when blended in a mineral oil that had 43 sec. Say Univ. at 210° F. and a viscosity index of 114 gave a polymer blend that had a viscosity index of 131 and an S. S. U. at 210° F. of 58. The percent copolymer present in oil was about 1.3% by weight.

Example 3

A styrene-isobutylene copolymer having a combined styrene content of about 50% by weight was made at a copolymerization temperature of about −100° C. This copolymer had an intrinsic viscosity of 0.9. A 20% by weight solution of this styrene-isobutylene copolymer in sperm oil was made by heating the mixture on a stem bath. The resulting solution was then reacted with $P_2S_5$, in the proportions of 15 grams of $P_2S_5$ per 100 grams of the polymer-oil solution, using a reaction temperature of about 150–180° C. for 3 hours. The reaction mixture was cooled overnight, and the next day, as the product was slightly gelatinous, it was diluted with about 20 grams of benzene per 100 grams of the reaction mixture, and heated, whereupon a clear solution was produced, and this was then filtered through filter paper. The benzene was removed on a steam bath and the product remained clear.

Upon analysis, the $P_2S_5$-polymer-oil reaction product showed 3.7% sulfur, and 2.08% by weight of phosphorus.

This reaction product, when dissolved in 6% by weight concentration in a naphthenic lubricating oil base stock of S. A. E. viscosity range, carried 8 weights on shock loading, and 10 weights on gradual loading in the Almen machine test for E. P. (extreme pressure) lubricating properties. Similarly, when tested in 10% concentration in the same oil base stock, it carried 12 weights on shock loading and 14 on gradual loading.

A 6% by weight solution of the same reaction product in a paraffinic base lubricating oil showed the following data on viscosity index and viscosity (S. S. U.) at 210° F.

|  | Vis. (S. S. U.) 210° F. | V. I. |
|---|---|---|
| A. Oil Basestock | 43 | 106 |
| B. 'A' +6% reaction product of Example 3 | 49 | 128.7 |

The above viscosity data showed that this product has the unexpected property of imparting a great improvement in viscosity index with relatively a small increase in the viscosity at 210° F. (3.8 units increase in V. I. per unit increase in S. S. U. at 210° F.)

This same reaction product was also dissolved in 6% concentration in a slightly lighter grade of naphthenic base lubricating oil, and the following viscosity test results were obtained.

|  | Vis. (S. S. U.) 210° F. | V. I. |
|---|---|---|
| C. Oil Basestock | 40 | 55 |
| D. 'C' + 6% reaction product of Example 3 | 48 | 108 |

The above viscosity data show that this reaction product exhibits an even more striking improvement in viscosity index in an oil basestock having a viscosity index per se in the intermediate range of 55, the improvement in this instance amounting to 6.62 increase in units V. I. per unit increase in viscosity at 210° F. These improvements are much better than those obtained in Examples 1 and 2, which do not combine the fatty oil.

The reaction product of Example 3 was also found to be an antioxidant. This was demonstrated by hot milling a polyisobutylene of 100,000 molecular weight (Staudinger method) at 300° F. for 30 minutes, both alone and with 2% by weight of the reaction product of Example 3. Molecular weight determinations at the end of the hot milling tests showed that the polymer alone broke down in molecular weight to 34,000, whereas polymer containing 2% of the reaction product of Example 3 only broke down to 64,000 molecular weight. This shows a very substantial and unobvious oxidation inhibiting effect for this type of a reaction product.

The antioxidant properties of this reaction product of Example 3 are also shown by a Norma-Hoffman bomb test on a mineral oil soda-lime grease having a high melting point of about 300 to 400° F., to which had been added 0.8% of this reaction product. The pressure drop after an indicated number of hours is shown.

| Hours | 16 | 20 | 46 | 60 |
|---|---|---|---|---|
| Pressure drop (lbs. per square inch) | 5 | 10 | 34 | 45 |

Although data are not available on the identical sample of grease without additive, the following data are available on another sample of the same commercial grease.

| Hours | 22 | 46 | 70 | 90 |
|---|---|---|---|---|
| Pressure drop (lbs. per square inch) | 55 | 68 | 77 | 81 |

It is apparent that this additive has good antioxidant properties in mineral lubricating oil-soap greases.

The copolymer to be used should generally have a content of about 5 to 70% or preferably 10 to 60% by weight of combined aromatic constituents, e. g. styrene, and 30 to 95 or 40 to 90% of $C_4$ to $C_8$ olefinic hydrocarbon, but the particular proportion preferred may vary depending on the intended use of the final product. For best solubility in paraffinic lubricating oils, the copolymer starting material should preferably contain about 10 to 40% by weight of combined styrene or other aromatic constituents. When the material is to be used in fatty oils or when the solubility requirements in paraffinic oils are not too stringent, the copolymer may contain somewhat more of the styrene and/or other aromatic constituents. The copolymers having an intrinsic viscosity of 0.1 to 0.5 are more readily soluble in the fatty oils and waxes, but the copolymers having higher intrinsic viscosities of 0.5 to 1.5 have more potent V. I. characteristics, and impart these to the reaction products.

In carrying out the reaction, an inert diluent may be used such as a light lubricating oil base stock, e. g. S. A. E. 10 or 20 grade, or a volatile diluent such as naphtha, refined kerosene, refined gas oil, etc., or aromatic hydrocarbons such as benzene, toluene and xylene or mixed hydrocarbon fractions. The amount of such diluent should be about 0.1 to 5.0 volumes, preferably 0.5 to 2.0 volumes per volume of mixed reactants.

The fatty material to be used may generally be any of the oils, fats and waxes, and may be derived from animal, vegetable or fish sources. They may be of the drying, semi-drying or non-drying varieties. For many purposes, it is preferred to use fatty substances having an iodine number below 150 such as sperm oil, rapeseed oil, cottonseed oil, carnauba wax, etc. These have an iodine number between about 100 and 150. Still less unsaturated oils and fats such as beef tallow, castor oil, coconut oil, lard oil, palm oil, mutton tallow, hydrogenated fish oils, etc., which have iodine numbers in the range of 5 to about 100 may be used. For higher reactivity, and especially for ultimate use in fatty oil compositions, it may be preferred to use the drying oils such as linseed oil, tung oil, menhaden oil, etc. Dimerized or trimerized unsaturated fatty oils such as dilinoleic acid, or methyldilinoleate, as well as polymerized fatty oils may be used, as well as mixtures of these various esters, oils, fats and waxes.

The proportions of ingredients may range from 1 to 50% by weight, preferably 5 to 30% by weight of polymer and about 99 to 50% by weight, or preferably 95 to 70% by weight of the fatty material. The proportion of phosphorus sulfide reagent or reagents may vary from about 0.5% to 50%, but normally should be in the range of 1% to 20% by weight, based on the weight of combined polymer and fatty oil.

The reaction product, which is generally a light or dark colored oil containing about 1–10% sulfur and 0.1–5% phosphorus is a polyfunctional substance especially suitable as an additive for mineral lubricating oils, hydraulic oils, slushing oils, oil-soap greases, fatty oil compositions. They may also have utility in paints and varnishes containing linseed oil, tung oil, etc., with or without added pigments, thinners, driers, etc. In such paint compositions, the product may serve as an anti-skinning agent or as a mild antioxidant, but the amount used should not be enough to prevent proper drying. The product may also be used as an antioxidant and plasticizer in natural rubber and various synthetic rubbers such as GRS, GRI, butadiene-acrylonitrile, polychlorprene, polybutadiene, etc., as well as synthetic polymers such as polyisobutylene, polyethylene, styrene-isobutylene copolymers etc.

What is claimed is:

1. A $P_2S_5$ reaction product of a sperm oil solution containing about 20% by weight of a styrene-isobutylene copolymer having a combined styrene content of about 50% by weight and having an intrinsic viscosity of about 0.5 to 1.5.

2. The method of making novel polymeric products containing phosphorus and sulfur, which comprises making a solution of about 20% by weight of a styrene-isobutylene copolymer of about 50% styrene content in a fatty oil, and treating the resulting solution with a phosphorus sulfide at a reaction temperature of about 50° C. to about 250° C.

3. A lubricating oil composition comprising a major proportion of a mineral lubricating oil basestock, containing dissolved therein about 1 to 20% by weight of a $P_2S_5$ reaction product of a solution of about 20% by weight of a styrene-isobutylene copolymer having a combined styrene content of about 50% and an intrinsic viscosity of about 0.5 to 1.5, in about 80% by weight of sperm oil said reaction product containing between 1 and 10% sulfur and 0.1 to 5% phosphorus by weight.

WILLIAM H. SMYERS.
DAVID W. YOUNG.

REFERENCES CITED

The following references are of record in the file of this patent:

UNITED STATES PATENTS

| Number | Name | Date |
|---|---|---|
| 2,494,592 | Smyers | Jan. 17, 1950 |
| 2,498,628 | Cyphers | Feb. 28, 1950 |